Figure 1:
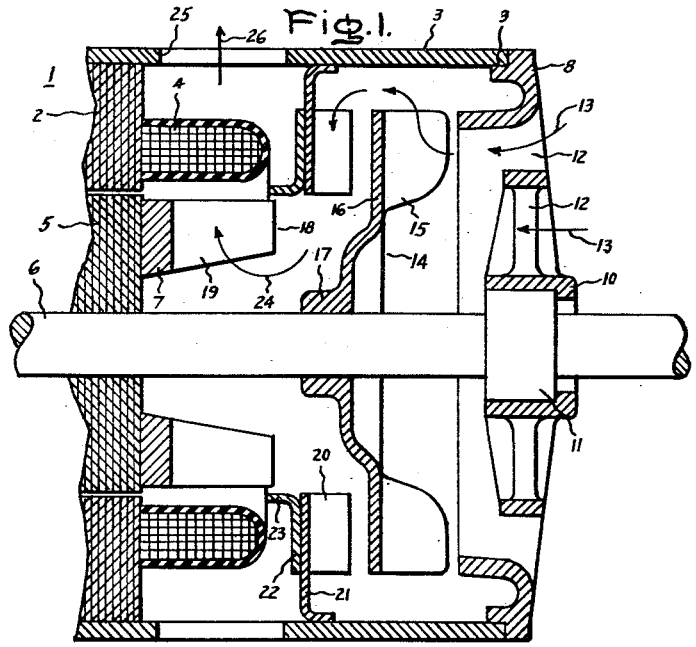

July 22, 1952  L. W. WIGHTMAN  2,604,501
DYNAMOELECTRIC MACHINE
Filed May 15, 1951

Inventor:
Lawrance W. Wightman,
by Ernest C. Britton
His Attorney.

UNITED STATES PATENT OFFICE 2,604,501

DYNAMOELECTRIC MACHINE

Lawrance W. Wightman, Fort Wayne, Ind., assignor to General Electric Company, a corporation of New York Application May 15, 1951, Serial No. 226,439

9 Claims. (Cl. 171—252)

This invention relates to dynamoelectric machines and more particularly to ventilating systems for such machines.

In the design of dynamoelectric machines, particularly in the fractional horsepower frame sizes, it is desirable to provide a ventilating system wherein the ventilating air is forced over the internal components of the machine at maximum velocity in order to effect maximum heat transfer. In such machines, the ventilating system must be characterized by its simplicity and ease of assembly and disassembly. Many ventilating arrangements have been built in the past utilizing a single fan for drawing air into the machine and for forcing the air over the various components to be cooled, such as the end turns of the windings. However, the head produced by a single fan is low, and its radial component of velocity is often low, particularly if the fan is arranged within the end turns. Arrangements using more than one fan have been constructed, however, in such arrangements the fans have tended to air lock and produce no substantial increase in pressure and have had the further disadvantage of complicating the assembly and disassembly of the machine. It is, therefore, desirable to provide a ventilating arrangement having two fans in which the sum of the heads of both fans may be utilized to effect heat transfer and which is further characterized by its simplicity and ease of assembly and disassembly.

An object of this invention is to provide an improved ventilating system for a dynamoelectric machine having the features enumerated above.

Further objects and advantages of this invention will become apparent by reference to the following description and the accompanying drawing, and the features of novelty which characterize this invention will be pointed out with particularity in the claims annexed to and forming a part of this specification.

In accordance with this invention, there is provided a two stage ventilating system for a dynamoelectric machine having a stator member mounted in a shell, a rotor member arranged within the stator, and an end shield having an opening formed therein for admitting air to the interior of the machine. A first fan is mounted on the shaft of the machine intermediate the end shield and the stator and a second fan is provided rotatable with the rotor and arranged intermediate the first fan and the stator. A plurality of stationary blades or stoppers are mounted on the inner periphery of the shell intermediate the first and second fans for directing the air discharged from the first fan into the second fan. In this way, the tendency for the air discharged by the first fan to rotate with the fan is eliminated and the velocity of air discharged from the second fan is greatly increased due to the sum of the heads of both fans. In order to facilitate assembly and disassembly of the machine, the inside diameter of the stationary blades is greater than the outside diameter of the second fan and the rotor so that the rotor assembly including both fans may be assembled outside of the stator and thereafter conveniently assembled and disassembled from the stator without the necessity for sequentially removing the first fan and the stationary blades.

Figure 2:
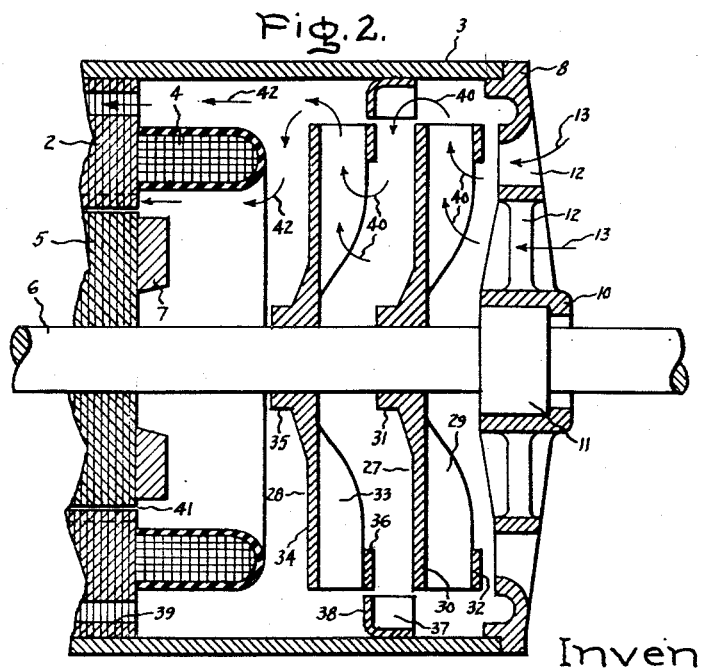

In the drawing, Fig. 1 is a side elevational view, partly in section, illustrating one form of this invention; and Fig. 2 is another side elevational view, partly in section, illustrating a modified form of this invention.

Referring now to Fig. 1, there is shown a dynamoelectric machine 1 having a stator member 2, shown here as being formed of laminated magnetic material, mounted in a shell member 3. The stator member 2 is provided with suitable winding slots (not shown) in which the appropriate windings of the machine are arranged with end turns 4 projecting therefrom. A rotor member 5, shown here as also being constructed of laminated magnetic material is suitably mounted on rotatable shaft 6. The rotor 5 is shown as being of the squirrel cage type having a suitable winding (not shown) arranged in slots in the outer periphery thereof connected by short circuiting end rings 7, which may be conventionally cast integral with the rotor winding. An end shield 8 is provided mounted on the shell 3 in any convenient manner, as by a rabbet fit 9, having a hub portion 10 for mounting the bearing 11 for shaft 6. A plurality of openings 12 are formed in the end shield 8 for admitting air to the interior of the machine, as shown by the arrows 13.

In order to provide for drawing the air into the interior of the machine and for forcing the air over the end turns 4 and out of the machine, a first radial flow fan 14 is provided having a plurality of blades 15 mounted on an imperforate back plate 16 with hub portion 17 being mounted on the shaft 6. The fan 14 is arranged intermediate the end shield 8 and the stator 2 with the back plate 16 being on the side thereof remote from the end shield 8. A second radial flow fan 18 is provided, shown here as being formed of a plurality of blades 19 cast integral with the end rings 7 and arranged within the end turns 4. If the fans 14 and 18 only where provided, an air lock would be formed with the second fan adding little, if any, increase in head. In order to stop the air discharged by the fan 14 from rotating in the shell 3 and to direct the air into the fan 18, a plurality of stationary blades or stoppers 20 are mounted on the inner periphery of the shell 3 intermediate the fan 14 and the fan 18. The blades 20 may be conveniently bent out from an annular plate 21 mounted in the shell 3 in any suitable manner, as by welding, and in order to close the openings formed by bending out the blades 20, an imperforate back plate 22 is suitably secured to the side of the plate 21 remote from the end shield 8 and the fan 14 and an annular flange portion 23 is formed on its inner periphery cooperating with the blades 19 of the fan 18 to form a radial running seal.

It will now be readily seen that air is drawn into the interior of the shell 3 through openings 12 in endshield 8, as shown by the arrows 13, and is directed from the first fan 14 to the second fan 18 by means of the stationary blades 20, as shown by the arrows 24. The second fan 18 discharges the air across the end turns 4 and out of a plurality of openings 25 formed in the outer periphery of the shell 3, as shown by the arrow 26.

It will be readily seen that a substantial inlet area can be provided by forming the air inlet openings in the end shield 8 and that the air velocity over the end turns 4 is derived from the sum of the head of both fans. Furthermore, this increased velocity is available at the exhaust of the fan 18 directly under the end turns 4. Since with the two stage ventilating system described above, there is a high radial as well as a high peripheral component of air velocity, the end turn heat transfer will be greatly increased over an arrangement utilizing a single fan. It will also be readily apparent that the rotor and the fan 14 can be assembled on the shaft 6 in a bench operation and the rotor shaft and fan assembly assembled and disassembled within the stator 2 since the outside diameter of the rotor 5 and the fan 18 is smaller than the inside diameter of the stationary blades 20. Thus it is not necessary to sequentially remove the fan 14 and the stationary blades 20 in order to remove the rotor from the machine.

Referring now to Fig. 2, in which like parts are illustrated by like reference numerals, there is shown a modified form of this invention in which both the first radial flow fan 27 and the second radial flow fan 28 are mounted on the shaft 6. Here, the first fan 27 is provided with a plurality of blades 29 mounted on imperforate back plate 30 which is provided with hub 31 mounted on shaft 6. The back plate 30 is on the side of the fan 27 remote from the end shield 8 and the ends of the blades 29 adjacent the end shield 8 are provided with a shroud 32. The second fan 28 is spaced from the first fan 27 and is similarly provided with a plurality of blades 33 mounted on imperforate back plate 34 having a hub 35 mounted on the shaft 6 with shroud 37 connecting the ends of the blades adjacent the fan 27. In order to direct the air from the fan 27 to the fan 28 and to prevent the air discharged by the fan 27 from circulating within the shell 3, a plurality of stationary blades or stoppers 37 are mounted on the inner periphery of the shell 3, the blades 37 being mounted on an imperforate back plate member 38 which is on the side of the blades remote from the end shield 8. In order to provide a dripproof construction, the openings 25 in the outer periphery of the shell 3 are eliminated and openings 39 are formed through the stator 2. It will be readily seen that the outside diameter of the fans 27 and 28 is smaller than the inside diameter of the stationary blades 37 and that the back plate 38 of the blades 37 forms a radial running seal with the shroud 36 of the fan 28.

It will be readily apparent that air is drawn into the interior of the shell 3 through the openings 12 and the end shield 8, as shown by the arrows 13, and is directed from the fan 27 to the fan 28 by the stationary blades 37, as shown by the arrows 40. The air discharged by the fan 28 is forced through the air gap 41 and the openings 39 through the stator 2 as shown by the arrows 42, this air passing over the end turns 4 to effect heat transfer therefrom. In this construction, the greater diameter of the second fan 28 produces a greater pressure to blow air through the stator openings 39 and the air gap 41. It will also be readily apparent that the rotor shaft and fan assembly can be readily removed from the machine since the outside diameter of the fans 27 and 28 is smaller than the inside diameter of the stationary blades 37. This construction is of special advantages in two-pole motors where the outside diameter of the rotor is small with respect to the outside diameter of the entire motor and thus a fan formed integral with the end ring would be rather ineffective. Also, in such machines, the distance from the winding slots to the outside of the stator is greater and the number of slots is fewer. Thus, the openings 39 in the stator can be readily accommodated and the higher thermal resistance features in two-pole machine make ventilation through openings in the stator particularly advantageous. The construction of Fig. 1 can also be easily made dripproof by placing shields or louvers over the openings 26.

It has been found that the internal two stage ventilating arrangement shown in Fig. 2 will produce approximately twice the pressure produced by an arrangement utilizing a single fan and that the arrangement shown in Fig. 1 will produce approximately 1.4 times the pressure. As pointed out above, if the stoppers or stationary blades 20 in the case of Fig. 1 and 37 in the case of Fig. 2 were not provided, the two fans would air lock and produce practically no increase in pressure.

While I have shown and described particular embodiments of this invention, further modifications and improvements will occur to those skilled in the art. I intend, therefore, in the appended claims to cover all modifications which do not depart from the spirit and scope of this invention.

What I claim as new and desire to secure by Letters Patent of the United States is:

1. In a dynamoelectric machine having a stator member mounted in a shell and having windings arranged therein with end turns extending therefrom, a rotor member arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and rotatable with said rotor member, second radial flow fan means intermediate said stator member and said first fan means and spaced therefrom and rotatable with said rotor member, and a plurality of stationary blades mounted on the inner periphery of said shell intermediate said first fan means and said stator end turns and arranged to direct all of the air from said first fan means to said second fan means, the inside diameter of said stationary blades being greater than the outside diameter of said second fan means and said rotor member whereby the rotor and fan assembly may be removed from said machine.

2. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and mounted on said shaft, second radial flow fan means intermediate said stator member and said first fan means and spaced therefrom and rotatable with said rotor member, a plurality of stationary blades mounted on the inner periphery of said shell intermediate said first fan means and said stator end turns and arranged to direct all of the air from said first fan means to said second fan means, the inside diameter of said stationary blades being greater than the outside diameter of said second fan means and said rotor member whereby the rotor and fan assembly may be removed from said machine, and means forming a running seal between said stationary blades and said second fan means.

3. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and mounted on said shaft, said first fan means having an imperforate back plate on its side remote from said end shield, second radial flow fan means intermediate said stator member and said first fan means and spaced therefrom and rotatable with said rotor member, a plurality of stationary blades mounted on the inner periphery of said shell intermediate said first fan means and said stator end turns and arranged to direct all of the air from said first fan means to said second fan means, said stationary blades having an imperforate back plate on the side remote from said end shield, the inside diameter of said stationary blades being greater than the outside diameter of said second fan means and said rotor member whereby the rotor and fan assembly may be removed from said machine, and means forming a running seal between said back plate of said stationary blades and said second fan means.

4. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and mounted on said shaft, second radial flow fan means intermediate said stator member and said first fan means and spaced therefrom and rotatable with said rotor member, and a plurality of stationary blades mounted on the inner periphery of said shell intermediate said first fan means and said stator end turns and arranged to direct all of the air from said first fan means to said second fan means, the inside diameter of said stationary blades being greater than the outside diameter of said second fan means and said rotor member whereby the rotor and fan assembly may be removed from said machine, said shell having an opening formed in its outer periphery intermediate said stationary blades and said stator member for discharging air from said machine.

5. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and mounted on said shaft, said first fan means having an imperforate back plate on the side remote from said end shield, second radial flow fan means intermediate said stator member and said first fan means and spaced therefrom and rotatable with said rotor member, a plurality of stationary blades mounted on the inner periphery of said shell and arranged intermediate said first fan means and said stator end turns and arranged to direct all of the air from said first fan means to said second fan means, said stationary blades having an imperforate back plate on the side remote from said end shield, the inside diameter of said stationary blades being greater than the outside diameter of said second fan means and said rotor member whereby the rotor and fan assembly may be removed from said machine, said shell having an opening formed in its outer periphery intermediate said stationary blades and said stator member for discharging air from said machine, said second fan being arranged within said end turns whereby air discharged therefrom is forced over said end turns, and means forming a running seal between said back plate number of said stationary blades and said second fan means.

6. In a dynamoelectric machine having a stator member mounted in a shell and having windings arranged therein with end turns extending therefrom, a rotor member mounted on a shaft and arranged within said stator member, and an end shield having an opening formed therein for admitting air to the interior of said machine; a two stage ventilating system for forcing air through said machine comprising first radial flow fan means in said shell intermediate said end shield and said stator member end turns and mounted on said shaft, second radial flow fan means intermediate said stator member and said first fan means and spaced therefrom and mounted on said rotor member, a plurality of stationary blades mounted on the inner periphery of said shell intermediate said first fan means and said stator end turns and arranged to direct all of the air from said first fan means to said second fan means, the inside diameter of said stationary blades being greater than the outside diameter of said second fan means and said rotor member whereby the rotor and fan assembly may be removed from said machine, the outside diameter of said first fan means being greater than the inside diameter of said stationary blades, said shell having an opening formed in its outer periphery intermediate said stationary blades and said stator member for discharging air from said machine, said second fan being arranged within said end turns whereby the air discharged therefrom is forced over said end turns.

7. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns mounted on said shaft, second radial flow fan means intermediate said stator member and said first fan means and spaced therefrom and rotatable with said rotor member, and a plurality of stationary blades mounted on the inner periphery of said shell intermediate said first fan means and said stator end turns and arranged to direct all of the air from said first fan means to said second fan means, the inside diameter of said stationary blades being greater than the outside diameter of said first and second fan means and said rotor member whereby the rotor and fan assembly may be removed from said machine.

8. In a dynamoelectric machine having a stator member mounted in a shell and having windings arranged therein with end turns extending therefrom, a rotor member mounted on a shaft and arranged within said stator member, and an end shield having an opening formed therein for admitting air to the interior of said machine; a two stage ventilating system for forcing air through said machine comprising first radial flow fan means in said shell intermediate said end shield and said stator member end turns and mounted on said shaft, second radial flow fan means intermediate said stator member in said first fan means and spaced therefrom and mounted on said shaft, said first and second fan means having equal outside diameters, a plurality of stationary blades mounted on the inner periphery of said shell intermediate said first fan means and said stator end turns and arranged to direct all of the air from said first fan means to said second fan means, the inside diameter of said stationary blades being greater than the outside diameter of said first and second fan means and said rotor member whereby the rotor and fan assembly may be removed from said machine, and means forming a radial running seal between said stationary blades and said second fan means.

9. In a dynamoelectric machine having a stator member mounted in a shell and having windings arranged therein with end turns extending therefrom, a rotor member mounted on a shaft and arranged within said stator member, and an end shield having an opening formed therein for admitting ventilating air to the interior of said machine; a two stage ventilating system for forcing air through said machine comprising first radial flow fan means in said shell intermediate said end shield and said stator member end turns and mounted on said shaft, said first fan means having an imperforate back plate on its side remote from said end shield, second radial flow fan means intermediate said stator member and said first fan means and spaced therefrom and mounted on said shaft, said second fan means having an imperforate back plate on its side remote from said end shield, a plurality of stationary blades mounted on the inner periphery of said shell intermediate said first fan means and said stator end turns and arranged to direct all of the air from said first fan means to said second fan means, said stationary blades having an imperforate back plate on the side remote from said end shield, the inside diameter of said stationary blades being greater than the outside diameter of said first and second fan means and said rotor member whereby the rotor and fan assembly may be removed from said machine, said back plate of said stationary blades forming a radial running seal with said second fan means.

LAWRANCE W. WIGHTMAN.

REFERENCES CITED

The following references are of record in the file of this patent:

UNITED STATES PATENTS

| Number | Name | Date |
|---|---|---|
| 2,307,785 | Merrill | Jan. 12, 1943 |
| 2,488,365 | Abbott | Nov. 15, 1949 |

FOREIGN PATENTS

| Number | Country | Date |
|---|---|---|
| 106,646 | Austria | June 10, 1927 |
| 515,766 | Germany | Jan. 12, 1931 |